US012786268B2

(12) United States Patent
Farrer

(10) Patent No.: US 12,786,268 B2
(45) Date of Patent: Nov. 3, 2026

(54) SHIFTING COMPUTE NODE IDENTIFIERS

(71) Applicant: Hewlett Packard Enterprise Development LP, Spring, TX (US)

(72) Inventor: Dylan Farrer, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 100 days.

(21) Appl. No.: 18/952,689

(22) Filed: Nov. 19, 2024

(65) Prior Publication Data

US 2026/0143026 A1 May 21, 2026

(51) Int. Cl.
*H04L 67/1008* (2022.01)
*H04L 67/1025* (2022.01)

(52) U.S. Cl.
CPC ...... *H04L 67/1008* (2013.01); *H04L 67/1025* (2013.01)

(58) Field of Classification Search
CPC ........................ H04L 67/1008; H04L 67/1025
See application file for complete search history.

(56) References Cited

U.S. PATENT DOCUMENTS 7,167,856 B2 * 1/2007 Lawder ............... G06F 16/2264
7,752,311 B2 * 7/2010 Walker ................. H04L 67/104 709/218
8,041,735 B1 10/2011 Lacapra et al.
8,095,600 B2 * 1/2012 Hasha ................ H04L 12/4637 709/217
8,145,736 B1 * 3/2012 Tewari ................ G06F 16/1834 370/266
8,977,660 B1 * 3/2015 Xin ................. H04N 21/23103 707/827
9,106,440 B2 * 8/2015 Kogge .................... H04L 12/42
9,262,323 B1 2/2016 Shankaran et al.
9,729,382 B2 * 8/2017 Hu .......................... H04L 41/00

(Continued)

FOREIGN PATENT DOCUMENTS

CN 102067553 A * 5/2011 .......... H04L 63/126
CN 102148840 A * 8/2011

(Continued)

OTHER PUBLICATIONS

"Simple Efficient Load Balancing Algorithms for Peer-to-Peer Systems", Karger et al., (SPAA'04, Jun. 27-30, 2004). (Year: 2004).*

(Continued)

*Primary Examiner* — James R Sheleheda
(74) *Attorney, Agent, or Firm* — Trop, Pruner & Hu, P.C.

(57) ABSTRACT

In some examples, a distributed system assigns key-value pairs to respective compute nodes of a plurality of compute nodes based on relationships of key identifiers of keys in the key-value pairs and node identifiers of the respective compute nodes on an identifier ring. A compute node determines whether a first gap on the identifier ring between node identifiers of first successive compute nodes is larger than a second gap on the identifier ring between node identifiers of second successive compute nodes. Based on determining that the first gap is larger than the second gap, the compute node initiates a shift operation that changes a node identifier of the compute node of the first successive compute nodes to reduce a size of the first gap on the identifier ring.

20 Claims, 7 Drawing Sheets

(56) References Cited

U.S. PATENT DOCUMENTS 9,785,522 B2 * 10/2017 Kulkarni ............. G06F 11/2033
10,235,404 B2 * 3/2019 Reddy .................... G06F 16/951
10,254,996 B1 4/2019 Jain et al.
10,616,318 B1 * 4/2020 Katey ................. H04L 67/1017
12,001,695 B2 6/2024 Pallipadi et al.
2005/0030902 A1 * 2/2005 Choi ................. H04L 12/40097 370/254
2006/0087990 A1 * 4/2006 Kakivaya ................ H04L 45/54 370/299
2007/0230482 A1 * 10/2007 Shim ........................ H04L 12/42 370/400
2007/0233832 A1 * 10/2007 Narayanan ............ H04L 67/104 709/223
2008/0031246 A1 * 2/2008 Hasha ................. H04L 61/4535 370/390
2008/0123664 A1 * 5/2008 Schwan .............. G06F 16/2471 370/395.32
2008/0310302 A1 * 12/2008 Detwiler ............... H04L 67/104 370/230
2009/0040946 A1 * 2/2009 Archer .................... H04L 12/42 370/255
2009/0092144 A1 * 4/2009 Wepiwe .................. H04L 63/12 370/406
2009/0292905 A1 * 11/2009 Faraj ...................... G06F 9/5061 712/225
2010/0161817 A1 * 6/2010 Xiao ................... H04L 67/1046 709/229
2010/0162035 A1 * 6/2010 Rancurel ............. H04L 67/1095 714/4.1
2010/0228848 A1 * 9/2010 Kis ...................... H04L 67/1065 709/238
2010/0322256 A1 * 12/2010 Riley ....................... H04L 45/64 370/400
2010/0325190 A1 * 12/2010 Riley .................. G06F 11/2097 709/251
2011/0082928 A1 * 4/2011 Hasha ...................... H04L 43/00 709/224
2011/0153634 A1 * 6/2011 Chu ....................... H04L 67/104 707/E17.001
2013/0151713 A1 * 6/2013 Faraj ........................ H04L 67/10 709/227
2013/0263151 A1 * 10/2013 Li ......................... G06F 9/5083 718/105
2013/0343227 A1 * 12/2013 Chu ......................... H04L 12/42 370/255
2014/0123132 A1 * 5/2014 Alicherry .............. G06F 9/5066 718/1
2014/0181035 A1 6/2014 Moue et al.
2014/0244794 A1 * 8/2014 Nakadai ................ H04L 67/104 709/217
2014/0279902 A1 9/2014 Hattori
2014/0365681 A1 * 12/2014 Hamada ................ G06F 9/5083 709/235
2015/0213032 A1 7/2015 Powell et al.
2015/0379009 A1 * 12/2015 Reddy ................. G06F 16/2343 707/747
2017/0302524 A1 * 10/2017 Iorga ........................ H04L 41/12
2017/0357682 A1 * 12/2017 Matsuda ............... G06F 16/273
2017/0359243 A1 * 12/2017 Deuri .................. H04L 41/0627
2018/0373771 A1 * 12/2018 Ashwood-Smith ..... G06F 16/27
2020/0026446 A1 * 1/2020 Jawahar .................. G06F 3/065
2022/0116334 A1 * 4/2022 Zhu ........................ H04L 49/901
2023/0229323 A1 * 7/2023 Pallipadi ................. G06F 3/065 711/171
2023/0239350 A1 * 7/2023 Chen ................... H04L 67/1097 709/213
2025/0202976 A1 * 6/2025 Syed ................... H04L 67/1046
2026/0072939 A1 * 3/2026 Farrer ...................... G06F 16/27
2026/0143026 A1 * 5/2026 Farrer ................. H04L 67/1008

FOREIGN PATENT DOCUMENTS

CN 116264574 A * 6/2023
EP 1926276 A1 * 5/2008 ......... H04L 67/1046
JP 2010272011 A * 12/2010
WO WO-2011109986 A1 * 9/2011 ............ H04W 8/265
WO WO-2022031970 A1 * 2/2022 ............. G06F 9/546
WO WO-2024125731 A1 * 6/2024 ........... H04L 12/413

OTHER PUBLICATIONS

Amazon Web Services, Inc., “Amazon EC2 Spot Instances,” accessed Aug. 27, 2024, 10 pages.
Amazon Web Services, Inc., “Spot Instances,” accessed Aug. 27, 2024, 5 pages.
Farrer et al., U.S. Appl. No. 18/827,917 entitled Handling Key-Value Pairs in Compute Nodes of a Distributed System filed Sep. 9, 2024 (53 pages).
Kaashoek et al., Koorde: A simple degree-optimal distributed hash table, Feb. 2003 (6 pages).
Malkhi et al., Viceroy: A Scalable and Dynamic Emulation of the Butterfly, 2002 (10 pages).
Maymounkov et al., Kademlia: A Peer-to-Peer Information System Based on the XOR Metric, 2002 (13 pages).
Ratnasamy et al., A Scalable Content-Addressable Network, 2001 (12 pages).
Rowstron et al., Pastry: Scalable, decentralized object location and routing for large-scale peer-to-peer systems, Nov. 2001 (22 pages).
Stoica et al., Chord: A Scalable Peer-to-Peer Lookup Protocol for Internet Applications, Feb. 2003 (16 pages).
Wikipedia, Chord (peer-to-peer) downloaded Aug. 25, 2024 (6 pages).
Zhao et al., Tapestry: A Resilient Global-scale Overlay for Service Deployment, Jan. 2004 (15 pages).

* cited by examiner

SHIFTING COMPUTE NODE IDENTIFIERS

BACKGROUND

A distributed system can include multiple compute nodes that are able to distribute workloads across the multiple compute nodes. For example, the multiple compute nodes can store respective subsets of data that can be accessed (read or written) in parallel.

BRIEF DESCRIPTION OF THE DRAWINGS

Some implementations of the present disclosure are described with respect to the following figures.

Figure 1A:
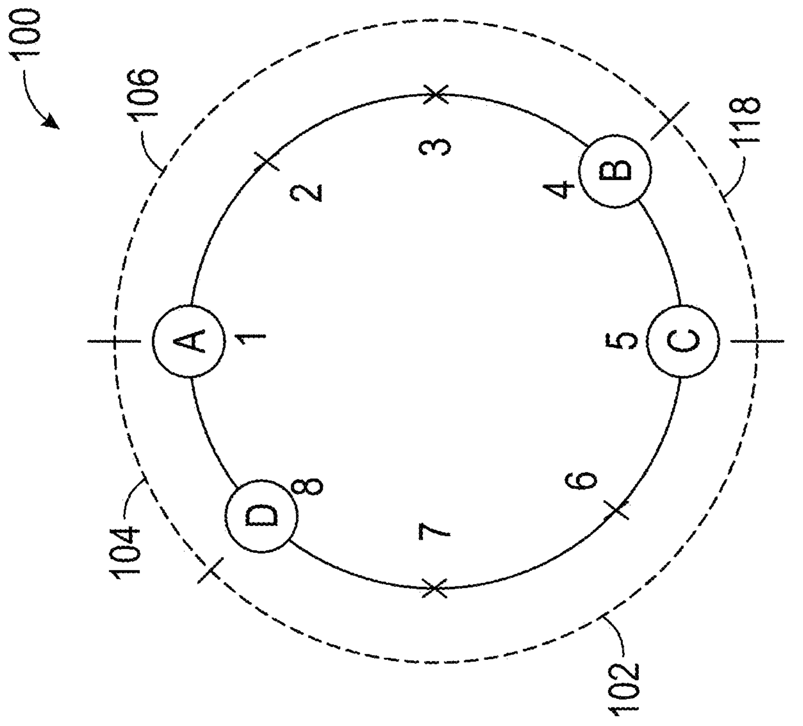
FIGS. 1A and 1B are block diagrams of identifier rings according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In some examples, multiple compute nodes of a distributed system can include respective key-value (KV) stores that store data as KV pairs. A KV pair includes a key and a value, where the key is a unique identifier of the value, and the value is a data item (e.g., a parameter, a file, an image, a pointer to a storage location of the data item, or any other type of object). The value of the KV pair can be retrieved based on the key. Keys can be mapped to different compute nodes. If a given key is mapped to a particular compute node, then the KV pair corresponding to the given key is stored at the particular compute node. In some examples, a hash function can be applied on a key to produce a hash that is used to produce a key identifier, and the key identifier selects a compute node from the multiple compute nodes of the distributed system to which the key is mapped. The hash function applied on different keys produces different hashes that map the different keys to respective compute nodes.

The assignment of keys to respective compute nodes can be based on a relationship of key identifiers of the keys to node identifiers of the compute nodes on an identifier ring (such as an identifier ring 100 shown in FIG. 1A). In the example of FIG. 1A, four compute nodes (A, B, C, D) are depicted at respective positions on the identifier ring 100. The position of a compute node on the identifier ring 100 is based on the node identifier of the compute node. Different key identifiers and node identifiers are positioned at corresponding positions on the identifier ring. More specifically, in some examples, key k is assigned to a compute node as follows. Key k is assigned to the first compute node whose node identifier is equal to or follows the key identifier of key k on the identifier ring. Such a compute node is referred to as a successor compute node of key k. Some compute nodes may be closer to one another than other compute nodes on the identifier ring, which means that certain successive compute nodes on the identifier ring will have larger gaps between them on the identifier ring than other successive compute nodes. "Successive" compute nodes on the identifier ring refers to a pair of compute nodes with no other compute node between the pair on the identifier ring. In FIG. 1A, a larger gap 102 exists between compute nodes C and D as compared to a smaller gap 104 between compute nodes D and A. The presence of a larger gap before a first compute node on the identifier ring (in the clockwise direction of the identifier ring) means that a greater quantity of keys may be placed along points of the larger gap, and thus assigned to the first compute node. The presence of a smaller gap before a second compute node on the identifier ring (in the clockwise direction of the identifier ring) means that a smaller quantity of keys may be placed along points of the smaller gap; as a result, the quantity of keys that may be assigned to the second compute node is less than the quantity of keys that may be assigned to the first compute node. The assignments of different quantities of keys to respective compute nodes results in in a load imbalance among the compute nodes, with some compute nodes experiencing heavy loads and other compute nodes experiencing light loads. The load imbalance can cause the performance of the heavily loaded compute nodes to suffer.

Additionally, as new compute nodes are added to a system in node join operations, the new compute nodes may be placed in gaps between existing compute nodes on the identifier ring. A new compute node placed in a gap bisects the gap, which can result in a subset of keys placed along the gap to be misplaced. This misplaced subset of keys is to be reassigned to the new compute node. Placing the new compute node in a larger gap results in a larger subset of keys being misplaced, and moving this larger subset of keys between different compute nodes results in greater resource usage (usage of processing, communication, and storage resources) as compared to moving a smaller subset of keys.

In accordance with some implementations of the present disclosure, a node identifier allocation system can shift node identifiers of compute nodes in a distributed system to balance gaps between successive compute nodes on an identifier ring. The distributed system assigns KV pairs to respective compute nodes of the distributed system based on relationships of key identifiers of keys in the KV pairs and node identifiers of the respective compute nodes on the identifier ring. The respective compute nodes are placed at positions on the identifier ring according to the node identifiers. The node identifier allocation system determines whether a first gap on the identifier ring between node identifiers of first successive compute nodes is larger than a second gap on the identifier ring between node identifiers of second successive compute nodes. Based on determining that the first gap is larger than the second gap, the node identifier allocation system initiates a shift operation that changes a node identifier of a first compute node of the first successive compute nodes to reduce a size of the first gap on the identifier ring.

In some examples of the present disclosure, by shifting node identifiers in response to detecting unequal gaps between node identifiers, a fairer allocation of keys to compute nodes can be achieved so that workloads of the compute nodes can be balanced to improve computer functionality. Decreasing variance in workloads of the compute nodes in a distributed system can allow for more efficient and faster performance of the workloads at the compute nodes. Additionally, the ability to balance workloads allows an organization to avoid overprovisioning the distributed system with a larger quantity of compute nodes or with compute nodes with higher processing capacities to meet unexpected spikes in workloads at any given compute node.

It is noted that the node identifier allocation system can be implemented using the compute nodes of the distributed system. Thus, the determination of presence of gaps of different sizes among successive compute nodes and the initiation of shift operations to change node identifiers can be performed at specific compute nodes.

An example of a distributed protocol that distributes KV pairs across a collection of compute nodes is the Chord protocol. Because Chord uses hashes to distribute KV pairs across compute nodes, the Chord protocol is also referred to as a "distributed hash table protocol." An example of the Chord protocol is described in Ion Stoica et al., "Chord: A Scalable Peer-to-Peer Lookup Protocol for Internet Applications," dated February 2003. Note that in the present discussion, a reference to "Chord" can refer to the Chord protocol as described in Stoica or to any other version of the Chord protocol. In further examples, other types of distributed protocols may be employed to map keys to compute nodes of a distributed system.

A "compute node" can refer to a physical computer (or multiple physical computers). Alternatively, a "compute node" can refer to a virtual compute node (or multiple virtual compute nodes). A virtual compute node can refer to a virtual machine (VM), a container, or any other type of virtual entity that can execute computational tasks.

In any of the various example distributed systems, KV stores can be stored in respective compute nodes of the distributed system. Each KV store contains KV pairs assigned to the compute node including the KV store. The assignment of a KV pair to a compute node is based on the key identifier of the key of the KV pair and the node identifier of the compute node.

An "identifier ring" is a representation of identifiers (node identifiers and key identifiers) in a space in which values of the identifiers are based on an arithmetic modulo $2^m$ operation, where each identifier is represented by m bits (m>1). For example, to obtain a key identifier of a key, a hash function is applied to the key that produces a key hash value. The arithmetic modulo $2^m$ operation is performed on the key hash value to obtain an m-bit key identifier of the key, where the m-bit key identifier produced by the arithmetic modulo $2^m$ operation corresponds to a position on the identifier ring. More generally, a different type of function can be applied to the key to produce a key function value, and the arithmetic modulo $2^m$ operation is performed on the key function value to obtain an m-bit key identifier of the key.

The identifier ring 100 of FIG. 1A includes ring positions 1 to 8 that corresponds to 3-bit identifier values produced by an arithmetic modulo 23 operation. Compute nodes A, B, C, and D are assigned node identifiers corresponding to ring positions 1, 4, 5, and 8, respectively. The node identifier of compute node A is placed at ring position 1 (in other words, compute node A has a node identifier that corresponds to ring position 1), the node identifier of compute node B is placed at ring position 4, the node identifier of compute node C is placed at ring position 5, and the node identifier of compute node D is placed at ring position 8.

FIG. 1A shows the larger gap 102 between compute nodes C and D and the smaller gap 104 between compute nodes D and A. FIG. 1A also shows a larger gap 106 between compute nodes A and B and a smaller gap 108 between compute nodes B and C. A "gap" between a first compute node and a second compute on the identifier ring refers to a region of the identifier ring in which no other compute node has a node identifier placed in the region between the node identifiers of the first and second compute nodes.

When assigning keys (of KV pairs) to respective compute nodes, key k is assigned to the first successor compute node whose node identifier is equal to or follows the key identifier of key k on the identifier ring 100 (in the clockwise direction). Thus, in the example of FIG. 1A, a key with a key identifier at ring position 2, 3, or 4 is assigned to compute node B, a key with a key identifier at ring position 5 is assigned to compute node C, a key with a key identifier at ring position 6, 7, or 8 is assigned to compute node D, and a key with a key identifier at ring position 1 is assigned to compute node A. Due to the larger gaps 102 and 106, more KV pairs may be assigned to compute nodes B and D than to compute nodes C and A.

In alternative examples, key k is assigned to the first successor compute node whose node identifier is equal to or follows the key identifier of key k on the identifier ring 100 (in the counterclockwise direction).

Figure 1B:
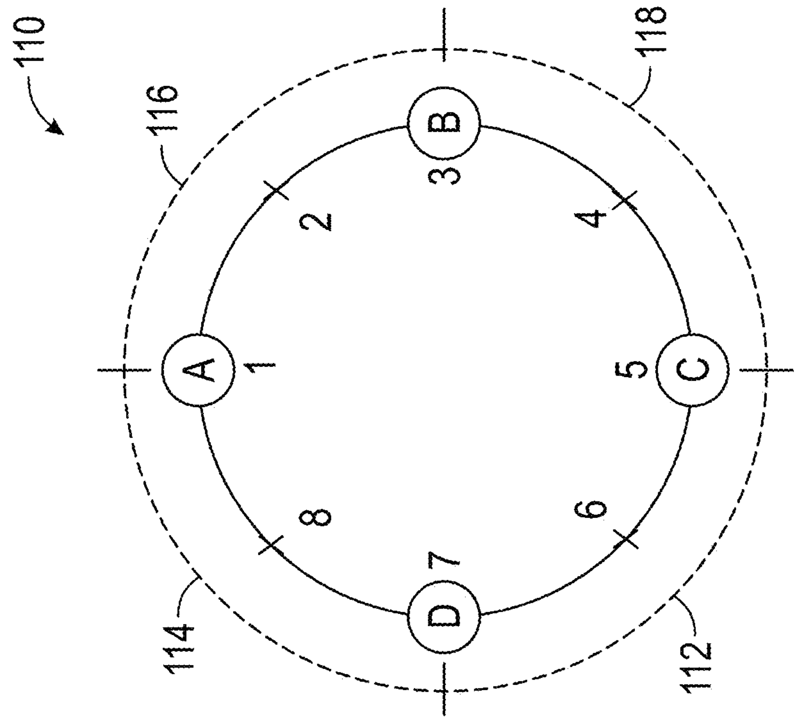

In accordance with some examples of the present disclosure, based on detecting the differences in sizes of gaps, compute nodes B and D can initiate respective shift operations to change the node identifiers of respective compute nodes D and B. As shown in FIG. 1B, the change of the node identifiers of compute nodes D and B results in compute node D being shifted from ring position 8 to ring position 7 on an identifier ring 110, and compute node B being shifted from ring position 4 to ring position 3 on the identifier ring 110. As a result of the shifts of compute nodes D and B on the identifier ring 110, the gaps between successive pairs of compute nodes on the identifier ring 110 are more equalized. In fact, as shown in FIG. 1B, the gaps 112, 114, 116, and 118 between different successive pairs of compute nodes are equal in size on the identifier ring 110.

More generally, after one or more shift operations, the gaps between successive pairs of compute nodes are reduced.

Figure 2:
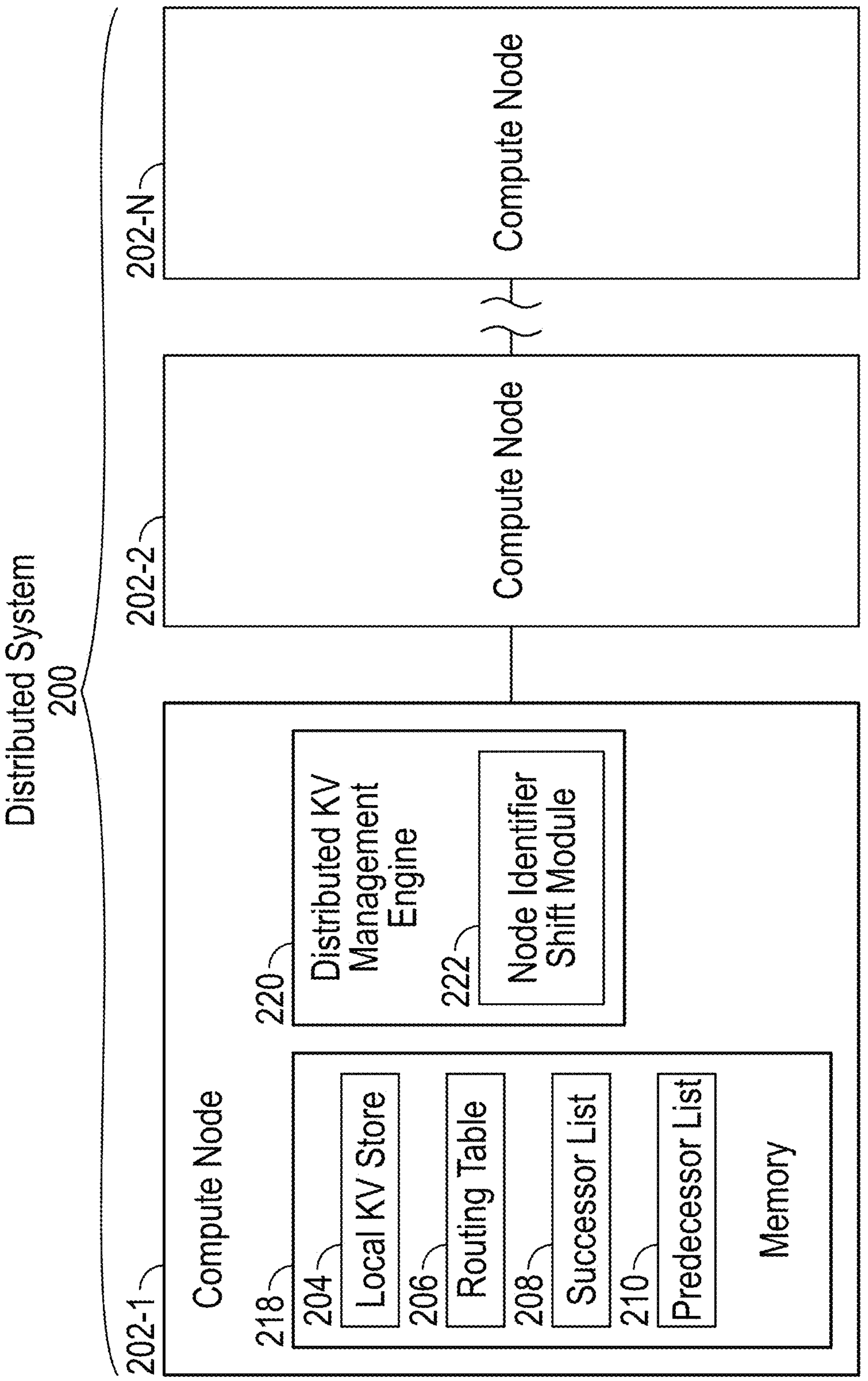
FIG. 2 a block diagram of a distributed system according to some examples.

FIG. 2 is a block diagram of a distributed system 200 according to some examples. The distributed system 200 may be a distributed storage system that stores data across multiple compute nodes 202-1, 202-2, . . . , 202-N (N≥2). In other examples, the distributed system 200 can perform processing tasks, such as executing application programs or other types of programs in the compute nodes 202-1 to 202-N. The processing tasks can make use of data stored across the compute nodes 202-1 to 202-N. As further examples, the distributed system 200 can be a distributed communication system to perform communication tasks across the compute nodes 202-1 to 202-N. The communication tasks can make use of data stored across the compute nodes 202-1 to 202-N.

In some examples, the distributed system 200 includes a peer-to-peer arrangement of the compute nodes 202-1 to 202-N, in which any given compute node is able to communicate with two peer compute nodes (including a predecessor compute node and a successor compute node as discussed below). In the peer-to-peer arrangement, a message from the given compute node is sent to a peer compute node, which can forward the message to another compute node. In other examples, the distributed system 200 can include a parallel arrangement of the compute nodes 202-1 to 202-N in which a given compute node can communicate directly over a network with any other compute node of the distributed system 200.

Keys are assigned to compute nodes based on arithmetic modulo $2^m$ operations applied on key function values (e.g., key hash values) derived from the keys. The identifier space produced by arithmetic modulo $2^m$ operations is represented by an identifier ring (e.g., 100 and 110 in FIG. 1A or 1B), where different ring positions on the identifier ring correspond to different identifiers, which can be key identifiers and node identifiers. Assuming that key identifiers and node identifiers are each m bits in length, then the identifier ring has $2^m$ points (ring positions) corresponding to the $2^m$ possible identifiers (key identifiers or node identifiers).

FIG. 2 shows components inside the compute node 202-1. The other compute nodes 202-2 to 202-N can have a similar arrangement of components. The compute node 202-1 includes a local KV store 204 that stores KV pairs assigned to the compute node 202-1. The compute node 202-1 is the owner of the KV pairs stored in the local KV store 204. Although not shown, the compute node 202-1 may also store a replica KV store, which contains copies of KV pairs owned by one or more other compute nodes.

The compute node 202-1 also includes a routing table 206. The routing table 206 contains information that the compute node 202-1 can use to determine at which compute node a key is stored, assuming the key is not in the local KV store 204 (or the replica KV store) of the compute node 202-1.

The compute node 202-1 includes a successor list 208, which identifies successor compute nodes of the compute node 202-1. The successor compute nodes of the compute node 202-1 include the immediate successor compute node (which is the compute node that immediately follows the compute node 202-1 on the identifier ring), and one or more secondary successor compute nodes. A secondary successor compute node follows the immediate successor compute node or another secondary successor compute node on the identifier ring. Note that there is no other compute node between the compute node 202-1 and the immediate successor compute node. Note that the term "successor list" can refer to either (1) a single successor list that identifies both the immediate successor compute node and one or more secondary successor compute nodes, or (2) two separate successor lists including an immediate successor list that identifies the immediate successor compute node and a secondary successor list that identifies one or more secondary successor compute nodes.

The compute node 202-1 also includes a predecessor list 210 that identifies a predecessor compute node of the compute node 202-1, which is the compute node that is immediately before the compute node 202-1 on the identifier ring. Each of the successor list 208 and the predecessor list 210 can be implemented using an array or any other type of data structure containing information to identify compute nodes. Although FIG. 2 shows an example with two separate lists 208 and 210, in other examples, the successor list 208 and the predecessor list 210 can be combined into a single list.

The various structures 204, 206, 208, and 110 can be stored in a memory 218, which can be implemented using one or more memory devices. The memory 218 may be a persistent memory implemented with one or more persistent memory devices, such as flash memory devices or other types of nonvolatile memory devices.

The compute node 202-1 further includes a distributed KV management engine 220 that manages the distributed storage of KV pairs across the compute nodes 202-1 to 202-N of the distributed system 200. Note that new compute nodes may join the distributed system 200, and existing compute nodes may leave the distributed system 200. In either case, a temporary unsettled state may arise that is addressed by the distributed KV management engine 220. Temporary unsettled states can include the following conditions: (1) keys are temporarily misplaced at one or more compute nodes, or (2) other compute nodes have obsolete information referring to keys stored at an exited compute node. A "misplaced" KV pair is a KV pair residing on a compute node that should not be at the compute node due to a changed condition caused by joinder of a new compute node to the distributed system 200 or the departure of an existing compute node from the distributed system 200.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

In some examples, the distributed KV management engine 220 includes a node identifier shift module 222 to initiate a shift operation to change a node identifier of the compute node 202-1. The other compute nodes in the distributed system 200 can similarly include node identifier shift modules to initiate respective shift operations to change node identifiers of the other compute nodes. A "module" of an engine can refer to a portion of the hardware processing circuitry of the engine, or machine-readable instructions executable by the engine.

Figure 3:
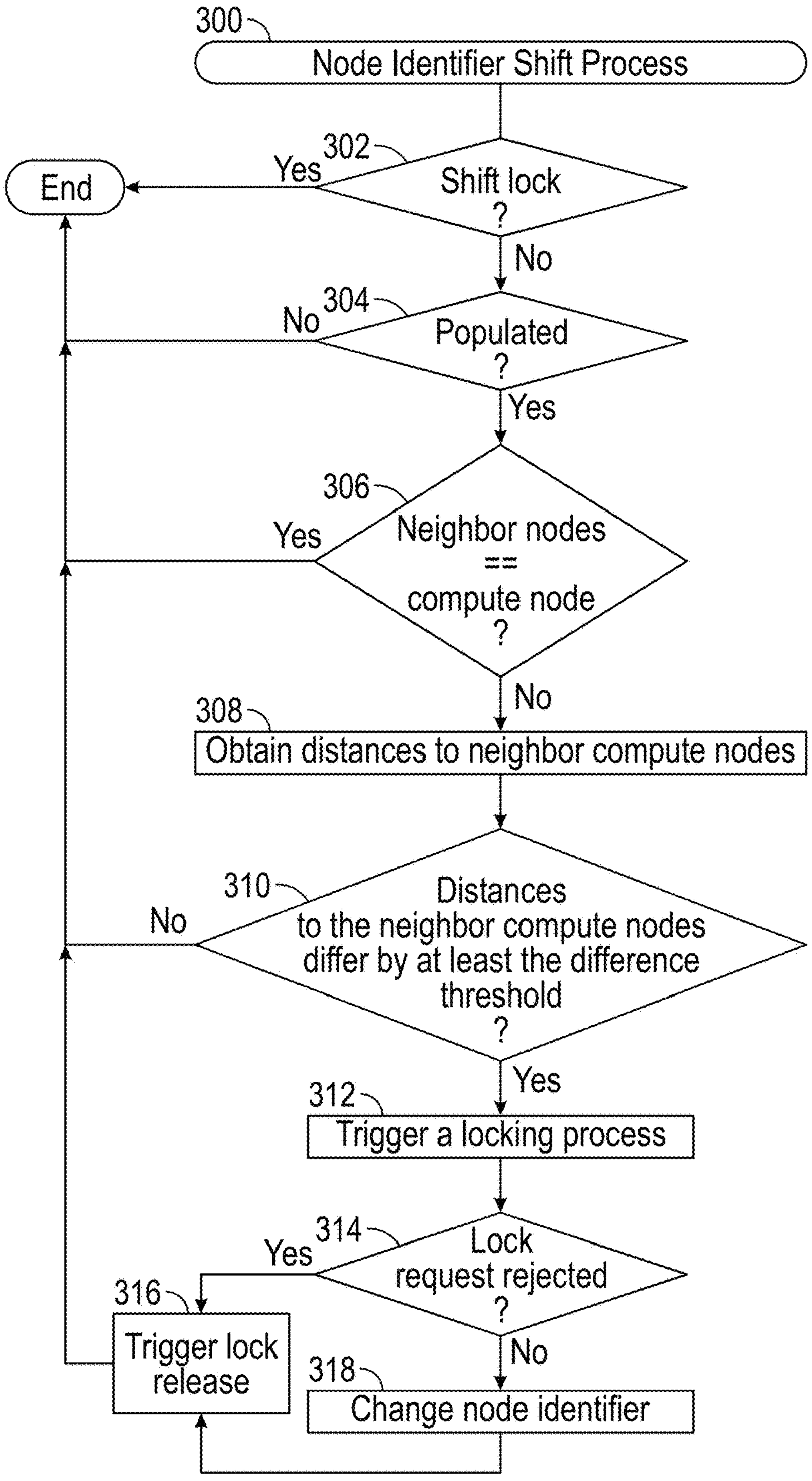
FIG. 3 is a flow diagram of a node identifier shift process according to some examples.

FIG. 3 is a flow diagram of a node identifier shift process 300 performed by a node identifier shift module (e.g., 222 in FIG. 2) in a compute node 202-*j* (j being selected from 1 to N) of the compute nodes 202-1 to 202-N. The node identifier shift process 300 can be performed on a periodic basis (e.g., performed once every specified time interval) or in response to a certain event (e.g., a detection of data access latency above a threshold, a detection of load of a compute node above a threshold, etc.). The node identifier shift module initiates the node identifier shift process 300 if the gaps between the compute node 202-*j* and its neighbor nodes are different. If the gaps between the compute node 202-*j* and its neighbor nodes are the same or differ by less than a difference threshold (e.g., 2), then the node identifier shift module does not initiate the node identifier shift process 300.

Although FIG. 3 shows a sequence of tasks, in other examples, the tasks may be performed in a different order, some tasks may be omitted, or other tasks may be added.

The node identifier shift module determines (at 302) if the compute node 202-*j* is under a shift lock. A shift lock indicates that the compute node 202-*j* is either performing a shift operation or the compute node 202-*j* is a neighbor compute node of another compute node that is involved in a shift operation. A "neighbor" compute node can refer to an immediate successor compute node of the compute node 202-*j* or an immediate predecessor node of the compute node 202-*j*.

There are two types of shift locks. A primary shift lock is set by a compute node that is performing a shift operation. A secondary shift lock is a shift lock requested by a neighbor compute node that is performing a shift operation. The primary shift lock is indicated by a primary shift lock flag being set. The secondary shift lock is indicated by a secondary shift lock flag being set. A "flag" refers to any information element that can be set to one of several different values. In some examples, a shift lock is set for a specified time duration ("expiry time"). After an expiration of the expiry time, the shift lock can be cleared.

The determination of whether the compute node 202-*j* is under a shift lock (at 302) can refer to a determination of whether the compute node 202-*j* has set a primary shift lock flag or a secondary shift lock flag. If the compute node 202-*j* is under a shift lock that has not expired, then the node identifier shift process 300 ends. However, if the compute node 202-*j* is not under a shift lock (i.e., neither the primary shift lock flag nor the secondary shift lock flag is set), the node identifier shift module determines (at 304) whether the routing table (e.g., 206 in FIG. 2) and the successor and predecessor lists (e.g., 208 or 210 in FIG. 1) of the compute node 202-*j* have been populated. If not, that indicates that the compute node 202-*j* is likely being initialized, and thus the compute node 202-*j* is not ready to perform a shift operation. If the routing table and successor and predecessor lists of the compute node 202-*j* are not populated, the node identifier shift process 300 ends.

However, if the node identifier shift module determines (at 304) that the routing table and successor and predecessor lists are populated, the node identifier shift module determines (at 306) whether neighbor nodes are the same as the compute node 202-*j*. This occurs if the compute node 202-*j* does not have predecessor and successor compute nodes (e.g., there is only one available compute node, the compute node 202-*j*, so far in the distributed system). If the neighbor compute nodes are the same as the compute node 202-*j*, then the node identifier shift process 300 ends. However, if the neighbor compute nodes are not the same as the compute node 202-*j* (i.e., there is at least one predecessor or successor compute node), the node identifier shift module obtains (at 308) compute node distances on an identifier ring. The obtained compute node distances include the distances between the compute node 202-*j* and its neighbor nodes (the immediate predecessor compute node and/or the immediate successor compute node).

For example, in FIG. 1A, if the compute node 202-*j* is compute node D, then the node identifier shift module in compute node D obtains the following: (1) a first distance between compute node D and the immediate successor compute node A, and (2) a second distance between compute node D and the immediate predecessor compute node C.

A "distance" between compute nodes on the identifier ring refers to how many ring positions separate node identifiers of the compute nodes on the identifier ring. In FIG. 1A, the distance between compute nodes D and A is 1, and the distance between compute nodes D and C is 3. Obtaining a distance between the compute nodes on the identifier ring can be performed by calculating a difference between the node identifiers of the compute nodes.

The node identifier shift module determines (at 310) whether the first distance (between the compute node 202-*j* and a first neighbor compute node) and the second distance (between the compute node 202-*j* and a second neighbor compute node) differs by at least a threshold quantity (e.g., 2 or some other number) of ring positions (this threshold quantity is the difference threshold). If not, the node identifier shift process 300 ends because the gaps between the compute node 202-*j* and its neighbor compute nodes are already balanced.

However, if the first distance and the second distance differs by at least the difference threshold, the compute node 202-*j* triggers (at 312) a locking process. The locking process includes the compute node 202-*j* setting the primary shift lock flag in the compute node 202-*j*, and sending secondary shift lock requests to the neighbor compute nodes of the compute node 202-*j* to request that the neighbor compute nodes set secondary shift locks.

In the example of FIG. 1A, the distance between compute node D (assumed to be the compute node 202-*j*) and its predecessor compute node C is greater than the distance between compute node C and compute node B by two ring positions. Assuming the threshold quantity is 2, then the condition to trigger the locking process for shifting a node identifier is satisfied.

The compute node 202-*j* determines (at 314) whether either of the neighbor compute nodes rejected the secondary shift lock request. A neighbor compute node may reject the secondary shift lock request if the neighbor compute node is performing a node identifier shift process. If the secondary shift lock request is rejected by either neighbor compute node, the node identifier shift module in the compute node 202-*j* triggers (at 316) a lock release process in which the compute node 202-*j* releases the primary shift lock in the compute node 202-*j* and sends, to the neighbor compute nodes of the compute node 202-*j*, secondary shift unlock requests. After the lock release process, the node identifier shift process 300 ends.

However, if neither of the neighbor compute nodes rejected the secondary shift lock requests, the node identifier shift module changes (at 318) the node identifier of the compute node 202-*j*. Both neighbor compute nodes can inform the compute node 202-*j* that the neighbor compute nodes have set their secondary shift locks. A neighbor compute node setting its secondary shift lock means that the neighbor compute node would not change the neighbor compute node's node identifier in a node identifier shift process.

The change of the node identifier of the compute node 202-*j* is by a delta value that seeks to equalize the gaps between the compute node 202-*j* and its neighbor compute nodes. For example, in FIG. 1A, the gap 104 between compute nodes D and A is 1, while the gap 102 between compute nodes D and C is 3. The change of the node identifier of compute node D is based on setting the gaps 102 and 104 to be the same if possible; if not, the node identifier of compute node D is changed by a delta value that reduces the difference between gaps 102 and 104 to one ring position. The node identifier shift process 300 can produce the identifier ring 110 of FIG. 1B, for example.

More generally, assuming the gap between the compute node 202-*j* and its immediate successor compute node is a distance P, and the gap between the compute node 202-*j* and its immediate predecessor compute node (which can be the same as or different from the successor compute node) is a distance Q, then the delta value by which the node identifier is changed is $$\left\lfloor \frac{P+Q}{2} \right\rfloor,$$

which is a floor function applied on $$\frac{P+Q}{2}.$$

The floor function returns an output value (which is the delta value) that is the greatest integer less than $$\frac{P+Q}{2}.$$

The node identifier of the compute node 202-*j* is increased or decreased by the delta value to balance the gaps between the compute node 202-*j* and its neighbor compute nodes so that the difference between the gaps is at most 1.

The node identifier shift module then triggers (at 316) the lock release process. After changing the node identifier of the compute node 202-*j*, misplaced keys are moved according to the following criterion: key k is assigned to the first compute node whose node identifier is equal to or follows the key identifier of key k on the identifier ring.

In some examples, because a node identifier shift process can displace KV pairs in compute nodes of the distributed system 200, in some examples, a shift restriction parameter can be configured to restrict the quantity of times that a node identifier shift process can be initiated per time interval. The shift restriction parameter can be set by an administrator, a program, or a machine. During any given time interval, the node identifier shift module in a compute node would not initiate more than the quantity of node identifier shift processes indicated by the shift restriction parameter. Alternatively, the shift restriction parameter may specify that a node identifier shift process can be initiated at a compute node once every M (M≥1) time intervals.

Requesters are able to access KV pairs stored at the compute nodes 202-1 to 202-N. A requester (e.g., a client device or a program) can issue a Get request to retrieve a value for a given key, and a requester can issue a Put request to write a KV pair. When a given compute node receives a Get request, the given compute node invokes a Get routine that checks whether key k requested by the Get request is in the local KV store (e.g., 204 in FIG. 2) or any replica KV store. If key k is in the local or replica KV store, the Get routine retrieves the value for key k from the local KV store or the replica KV store, and the given compute node returns the value to the requester. At this point, the get operation completes.

However, if key k of the Get request is not in the local or replica KV store of the given compute node, the Get routine may determine whether a key register (or another type of data structure) contains information identifying where key k is stored. If the key register contains information identifying one or more compute nodes that contain key k, the Get routine can select a compute node to query for key k. The selected compute node returns the KV pair for key k to the given compute node.

If the key register does not contain any information for key k, then the Get routine in the given compute node can initiate a lookup procedure to find the owner compute node, e.g., the first successor compute node that follows the key identifier of key k on the identifier ring. For example, the Get routine can call a Find Successor routine. The Find Successor routine can use the routing table (e.g., 206 in FIG. 2) of the given compute node. In some examples, the lookup procedure can be according to the Chord protocol, in which case the routing table includes a finger table. The Find Successor routine accesses the finger table in given compute node to determine if the entries of the finger table contain a node identifier that is equal to or follows the key identifier of key k on the identifier ring. If present, this node identifier identifies the owner compute node of key k. In this case, the given compute node forwards the Get request to the owner compute node, which can respond with the requested KV pair.

To handle a Put request from the requester, the given compute node invokes a Put routine that identifies the owner compute node of key k using the routing table. The Put request is forwarded to the owner compute node to write the KV pair.

The following describes various scenarios that can be addressed by the compute nodes 202-1 to 202-N of the distributed system 200.

A first scenario involves the compute node 202-*j* leaving the distributed system 200 after the compute node 202-*j* has started a node identifier shift process and issued secondary shift lock requests to the neighbor nodes of the compute node 202-*j*. In this first scenario, the neighbor compute nodes can wait for an expiry time for the secondary shift locks to expire. In response to the expiration of the expiry time at a neighbor compute node, the distributed KV management engine of the neighbor compute node can issue a status inquiry to the compute node 202-*j*. If the compute node 202-*j* does not respond to the status inquiry (because the compute node 202-*j* has left the distributed system 200), the distributed KV management engine of the neighbor compute node can determine that the compute node 202-*j* is no longer available and the distributed KV management engine of the neighbor compute node releases the secondary shift lock flag.

A second scenario involves a neighbor node leaving the distributed system 200 after the neighbor node has set the secondary shift lock and while the compute node 202-*j* is performing a node identifier shift process. Two possible actions may be performed to address the second scenario. If the compute node 202-*j* has already obtained the distance to the neighbor node that has left, the node identifier shift process at the compute node 202-*j* can continue to completion. However, if the compute node 202-*j* has not obtained the distance to the neighbor node that has left, the compute node 202-*j* cancels the node identifier shift process.

A third scenario involves a compute node 202-*k* receiving a secondary shift lock request from the compute node 202-*j*, but the compute node 202-*k* is not a neighbor of the compute node 202-*j* (i.e., the compute node 202-*k* is not an immediate predecessor or successor of the compute node 202-*j*). In this third scenario, the distributed KV management engine of the compute node 202-*k* does not set the secondary shift lock in response to the secondary shift lock request. Instead, the distributed KV management engine of the compute node 202-*k* sends an alert to the compute node 202-*j* that the secondary shift lock request was sent to the wrong compute node. In response to the alert, the compute node 202-*j* can cancel the node identifier shift process, as the compute node 202-*j* does not have an up-to-date list of its neighbors.

Figure 4:
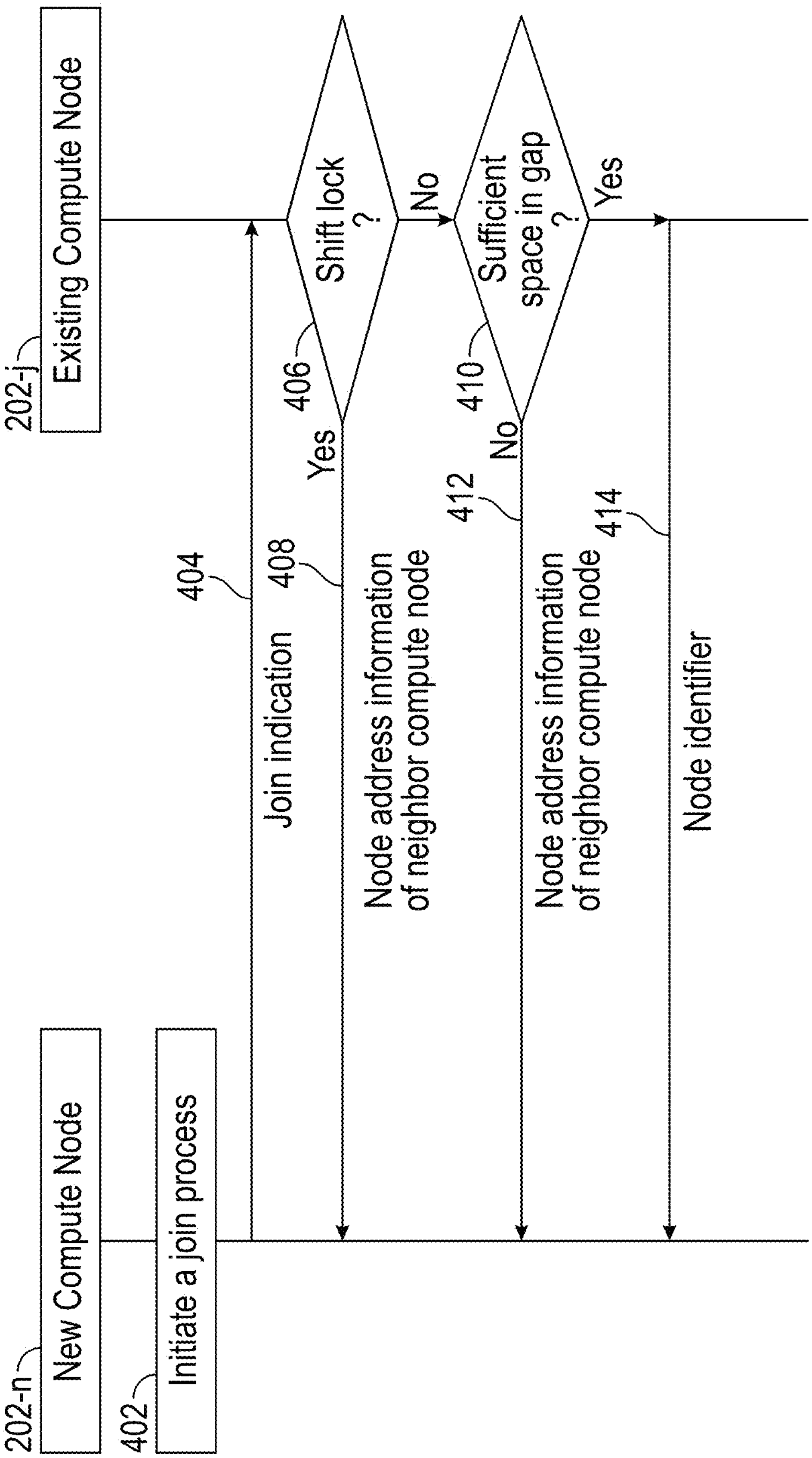
FIG. 4 is a flow diagram of a process to handle joinder of a new compute node, according to some examples.

A fourth scenario involves a new compute node 202-*n* joining the distributed system, as shown in FIG. 4. The distributed KV management engine of the new compute node 202-*n* can initiate (at 402) a join process. The new compute node 202-*n* may be configured with node address information of at least one other compute node in the distributed system 200. The node address information can include a network address, such as an Internet Protocol (IP) address, a Media Access Control (MAC) address, or another type of address. The node address information of the compute node can additionally include port information, such as a port number of a transport protocol (e.g., the Transmission Control Protocol (TCP), the User Datagram Protocol (UDP), or another type of transport protocol).

The distributed KV management engine of the new compute node 202-*n* can issue (at 404) a join indication (e.g., a join message, a join information element, etc.) to an existing compute node 202-*j* based on the other node address information configured at the new compute node 202-*n*. The join indication indicates to the distributed KV management engine of the existing compute node 202-*j* that the new compute node 202-*n* is joining the distributed system 200. In response to the join indication, the distributed KV management engine of the existing compute node 202-*j* determines (at 406) whether the existing compute node 202-*j* is under a shift lock. If so, the distributed KV management engine of the existing compute node 202-*j* provides (at 408), to the new compute node 202-*n*, node address information of a neighbor compute node of the existing compute node 202-*j*.

If the existing compute node 202-*j* is not under a shift lock, the distributed KV management engine of the existing compute node 202-*j* determines (at 410) if sufficient space exists in the gap between the existing compute node 202-*j* and its neighbor compute node to accommodate the new compute node 202-*n*. Sufficient space is present if at least two ring positions between the existing compute node 202-*j* and its neighbor compute node is not occupied by a node identifier of any compute node.

If sufficient space does not exist in the gap between the existing compute node 202-*j* and its neighbor compute node to accommodate the new compute node 202-*n*, the distributed KV management engine of the existing compute node 202-*j* provides (at 412), to the new compute node 202-*n*, node address information of a neighbor compute node of the existing compute node 202-*j*.

If sufficient space exists and the existing compute node 202-*j* is not currently under a shift lock, the distributed KV management engine of the existing compute node 202-*j* assigns (at 414) a node identifier to the new compute node 202-*n*, where the assigned node identifier is corresponds to a ring position that is halfway between the existing compute node 202-*j* and a neighbor compute node of the existing compute node 202-*j*. A ring position "halfway" between node identifiers on the identifier ring can refer to either a ring position that is exactly halfway between the node identifiers or as close as possible to the exact halfway ring position.

Figure 5A:
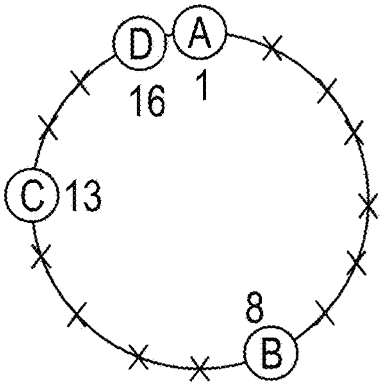
FIGS. 5A-5C and 6A-6F are block diagrams of identifier rings according to further examples.

In an example, FIG. 5A shows an identifier ring with 16 ring positions 1 to 16, which assumes use of 4-bit identifiers. In FIG. 5A, if compute node A receives a join indication from the new compute node 202-*n*, the distributed KV management engine of compute node A assigns a node identifier to the new compute node 202-*n*, where the assigned node identifier corresponds to either ring position 4 or 5 (which is halfway between compute node A and its immediate successor compute node B on the identifier ring).

In response to the node address information of the neighbor compute node received at the new compute node 202-*n*, the distributed KV management engine of the of the new compute node 202-*n* sends a join indication to the neighbor compute node, and the process of FIG. 4 is re-iterated.

Assigning node identifiers to joining compute nodes avoids node identifier collisions, which refers to two or more compute nodes being assigned the same node identifier.

Figure 5B:
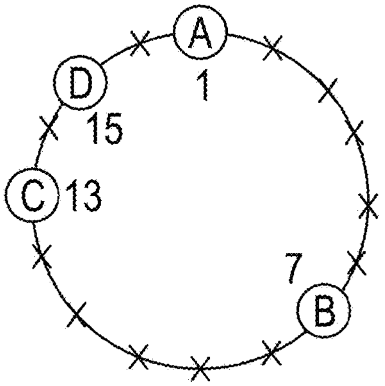
Figure 5C:
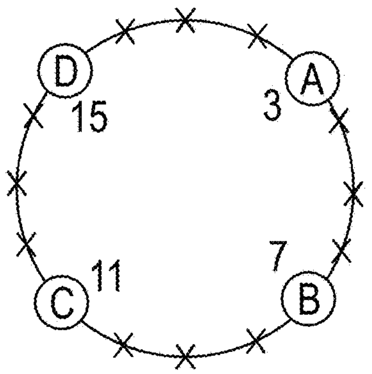

FIG. 5A shows an identifier ring representing four compute nodes A, B, C, and D, with node identifiers at ring positions 1, 8, 13, and 16, respectively. A first node identifier shift process is performed at compute nodes D and B to shift the node identifier of compute node D from ring position 16 to ring position 15, and shift the node identifier of compute node B from ring position 8 to ring position 7, as shown in FIG. 5B. A second node identifier shift process after the first node identifier shift process is performed at compute nodes C and A to shift the node identifier of compute node C from ring position 13 to ring position 11, and shift the node identifier of compute node A from ring position 1 to ring position 3, as shown in FIG. 5C. After these two node identifier shift processes, the positions of the compute nodes A, B, C, and D on the identifier ring is balanced.

Figure 6A:
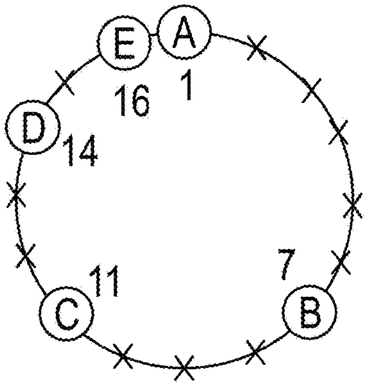
Figure 6B:
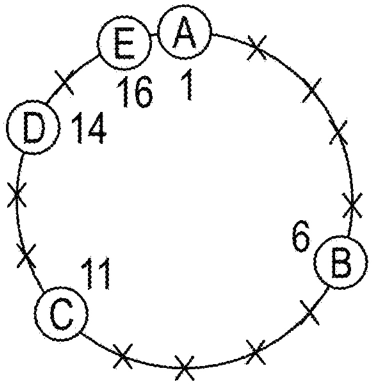
Figure 6C:
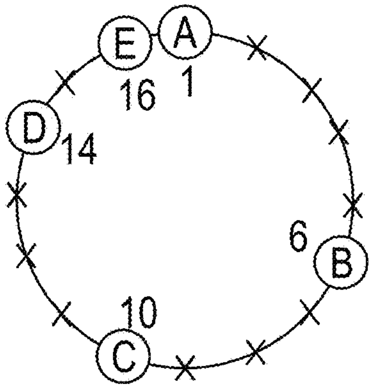
Figure 6D:
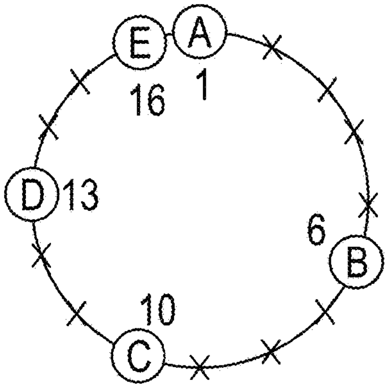
Figure 6E:
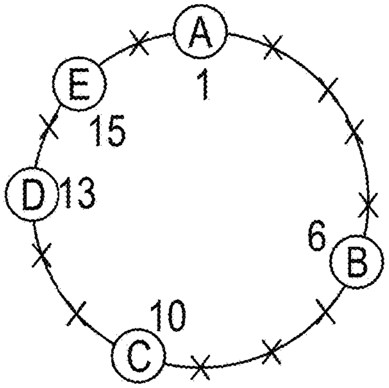
Figure 6F:
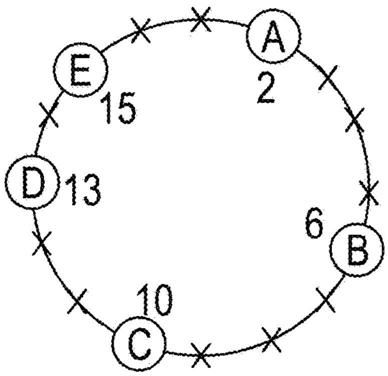

FIG. 6A to 6F show five node identifier shift processes to shift compute nodes A, B, C, D, and E. FIG. 6B shows the result of a first node identifier shift process, in which compute node B has shifted from ring position 7 to ring position 6. FIG. 6C shows the result of a second node identifier shift process, in which compute node C has shifted from ring position 11 to ring position 10. FIG. 6D shows the result of a third node identifier shift process, in which compute node D has shifted from ring position 14 to ring position 13. FIG. 6E shows the result of a fourth node identifier shift process, in which compute node E has shifted from ring position 16 to ring position 13. FIG. 6F shows the result of a fifth node identifier shift process, in which compute node A has shifted from ring position 1 to ring position 2.

After these five node identifier shift processes, the positions of the compute nodes A, B, C, D, and E on the identifier ring is balanced.

Generally, the number of node identifier shift processes employed to balance an identifier ring depends on a quantity of compute nodes and starting ring positions of the compute nodes on the identifier ring.

Figure 7:
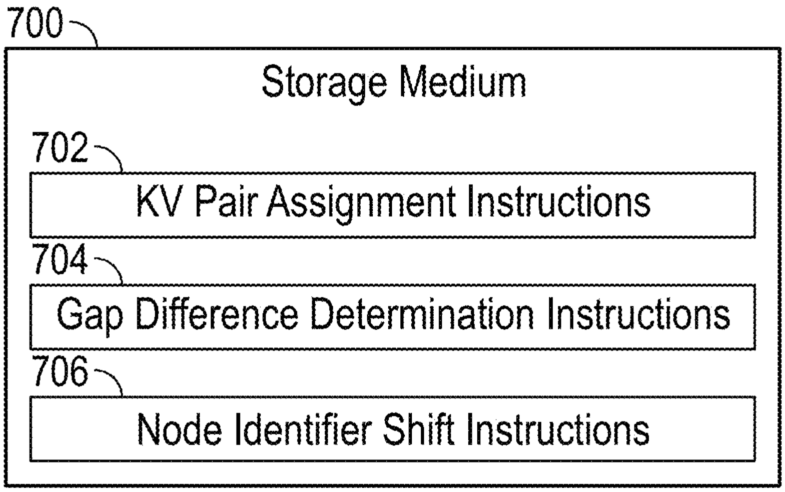
FIG. 7 is a block diagram of a storage medium storing machine-readable instructions according to some examples.

FIG. 7 is a block diagram of a non-transitory machine-readable or computer-readable storage medium 700 storing machine-readable instructions executable in a distributed system having a plurality of compute nodes. An example of the distributed system is the distributed system 200 of FIG. 2.

The machine-readable instructions include KV pair assignment instructions 702 to assign KV pairs to respective compute nodes of the plurality of compute nodes based on relationships of key identifiers of keys in the key-value pairs and node identifiers of the respective compute nodes on an identifier ring. The node identifiers of the respective compute nodes are placed at corresponding positions on the identifier ring. For example, a KV pair containing key k is assigned to the first compute node whose node identifier is equal to or follows the key identifier of key k on the identifier ring.

The machine-readable instructions include gap difference determination instructions 704 to determine whether a first gap on the identifier ring between node identifiers of first successive compute nodes is larger than a second gap on the identifier ring between node identifiers of second successive compute nodes. For example, in FIG. 1A, the first successive compute nodes can include compute nodes D and A, and the second successive compute nodes can include compute nodes D and C.

The machine-readable instructions include node identifier shift instructions 706 to, based on determining that the first gap is larger than the second gap, initiate a shift operation that changes a node identifier of a first compute node of the first successive compute nodes to reduce a size of the first gap on the identifier ring. In some examples, the shift operation is initiated if the first gap is larger than the second gap by at least a difference threshold.

In some examples, the machine-readable instructions can check, at the first compute node, whether the first compute node is under a shift lock. The determining of whether the first gap is larger than the second gap is performed is responsive to detecting that the first compute node is not under the shift lock. If the first compute node is under the shift lock, then the shift operation is not performed.

In some examples, the shift lock is a primary shift lock previously set as part of a prior shift operation of the first compute node. In further examples, the shift lock is a secondary shift lock requested by a neighbor compute node of the first compute node.

In some examples, the machine-readable instructions can request that neighbor compute nodes of the first compute node set secondary shift locks at the neighbor compute nodes. The shift operation is performed in response to the neighbor compute nodes accepting the request to set the secondary shift locks.

In some examples, after completion of the shift operation, the machine-readable instructions can release the primary shift lock at the first compute node, and request that the neighbor compute nodes release the secondary shift locks.

In some examples, the determining of whether the first gap is larger than the second gap includes determining whether the first gap is larger than the second gap by at least two positions (or some other difference threshold) on the identifier ring. The initiating of the shift operation is responsive to determining that the first gap is larger than the second gap by at least two positions on the identifier ring.

In some examples, a second compute node receives a request from a new compute node to join the distributed system. The second compute node assigns, to the new compute node, a new node identifier that is at a position halfway between the second compute node and a third compute node that is a neighbor of the second compute node.

In some examples, the second compute node determines whether a sufficient gap exists between the second compute node and the third compute node. The assigning of the new node identifier is based on determining that the sufficient gap exists between the second compute node and the third compute node.

In some examples, the second compute node determines whether the second compute node is under a shift lock. The assigning of the new node identifier is based on determining that the second compute node is not under the shift lock.

In some examples, the second compute node receives a request from the first compute node to set a secondary shift lock at the second compute node. The second compute node sets the secondary shift lock at the second compute node in response to the request. The second compute node detects an expiration of an expiry time of the secondary shift lock. In response to the expiration of the expiry time, the second compute node attempts to contact the first compute node. Based on detecting that the first compute node is no longer available, the second compute node releases the secondary shift lock at the second compute node.

In some examples, the second compute node receives a request from the first compute node to set a secondary shift lock at the second compute node. The second compute node detects that it is not a neighbor of the first compute node. Based on detecting that the second compute node is not a neighbor of the first compute node, the second compute node declines to set the secondary shift lock at the second compute node and sends an alert to the first compute node.

Figure 8:
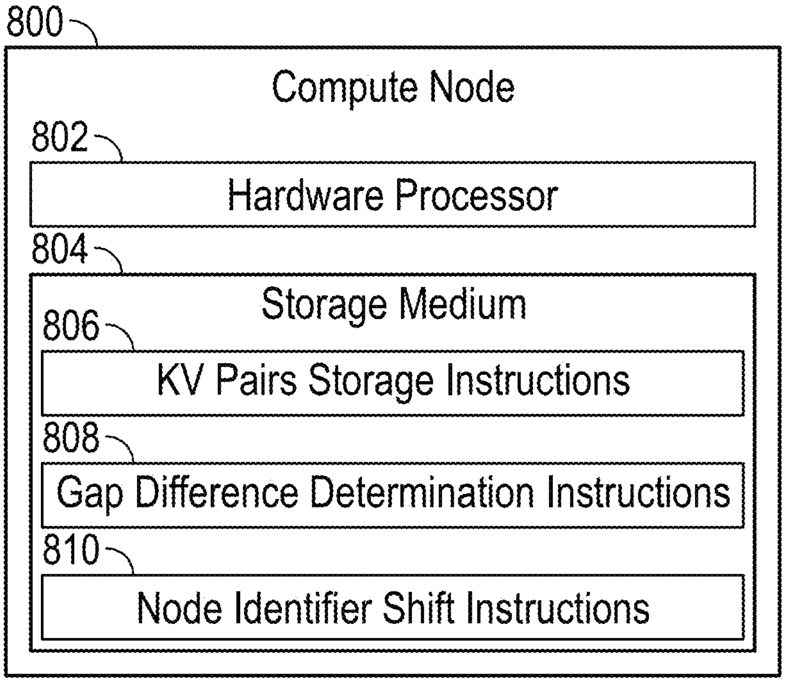
FIG. 8 is a block diagram of a compute node according to some examples.

FIG. 8 is a block diagram of a compute node 800 according to some examples. The compute node 800 includes a hardware processor 802 (or multiple hardware processors). A hardware processor can include a microprocessor, a core of a multi-core microprocessor, a microcontroller, a programmable integrated circuit, a programmable gate array, or another hardware processing circuit.

The compute node 800 further includes a storage medium 804 storing machine-readable instructions executable on the hardware processor 802 to perform various tasks. Machine-readable instructions executable on a hardware processor can refer to the instructions executable on a single hardware processor or the instructions executable on multiple hardware processors.

The machine-readable instructions in the storage medium 804 include KV pairs storage instructions 806 to store, at the compute node 800, a collection of KV pairs. The compute node 800 is part of a distributed system in which keys of KV pairs are assigned to respective compute nodes of a plurality of compute nodes based on relationships of key identifiers of the keys and node identifiers of the respective compute nodes on an identifier ring. The node identifiers of the respective compute nodes are placed at corresponding positions on the identifier ring.

The machine-readable instructions in the storage medium 804 include gap difference determination instructions 808 to determine whether a first gap on the identifier ring between a first node identifier of the first compute node and a second node identifier of a first neighbor compute node is different, by at least a difference threshold, from a second gap on the identifier ring between the first node identifier and a third node identifier of a second neighbor compute node.

The machine-readable instructions in the storage medium 804 include node identifier shift instructions 810 to, based on determining that the first gap is different from the second gap by at least the difference threshold, initiate a shift operation that changes the first node identifier to a different value to reduce a difference between the first gap and the second gap.

Figure 9:
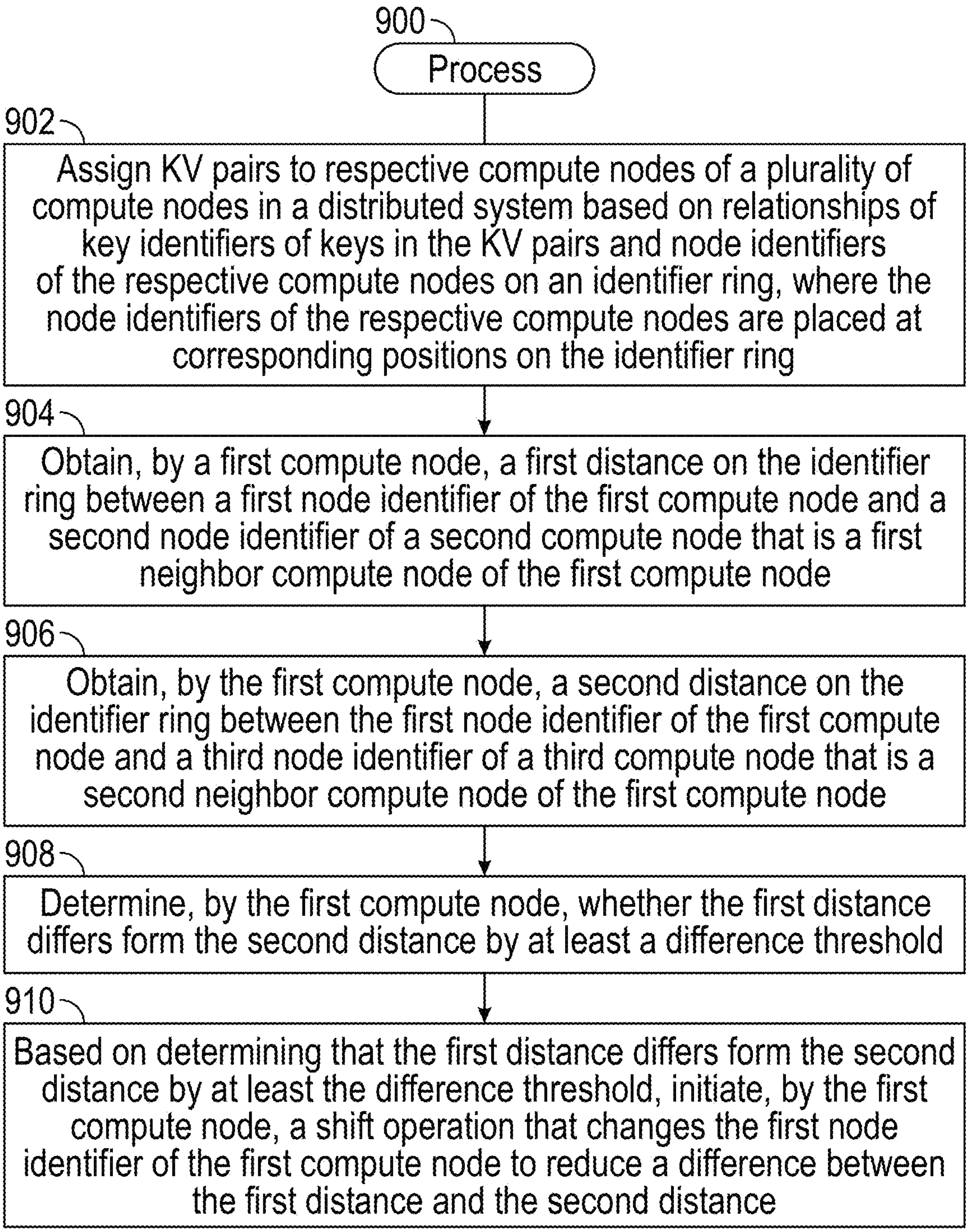
FIG. 9 is a flow diagram of a process according to some examples.

FIG. 9 is a flow diagram of a process 900 according to some examples of the present disclosure. The process 900 includes assigning (at 902) KV pairs to respective compute nodes of a plurality of compute nodes in a distributed system based on relationships of key identifiers of keys in the key-value pairs and node identifiers of the respective compute nodes on an identifier ring, where the node identifiers of the respective compute nodes are placed at corresponding positions on the identifier ring.

The process 900 includes obtaining (at 904), by a first compute node, a first distance on the identifier ring between a first node identifier of the first compute node and a second node identifier of a second compute node that is a first neighbor compute node of the first compute node.

The process 900 includes obtaining (at 906), by the first compute node, a second distance on the identifier ring between the first node identifier of the first compute node and a third node identifier of a third compute node that is a second neighbor compute node of the first compute node.

The process 900 includes determining (at 908), by the first compute node, whether the first distance differs from the second distance by at least a difference threshold. The difference threshold may be two ring positions on the identifier ring, for example.

The process 900 includes, based on determining that the first distance differs from the second distance by at least the difference threshold, initiating (at 910), by the first compute node, a shift operation that changes the first node identifier of the first compute node to reduce a difference between the first distance and the second distance.

A storage medium (e.g., 700 in FIG. 7 or 804 in FIG. 8) can include any or some combination of the following: a semiconductor memory device such as a dynamic or static random access memory (a DRAM or SRAM), an erasable and programmable read-only memory (EPROM), an electrically erasable and programmable read-only memory (EEPROM), or a flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions executable in a distributed system comprising a plurality of compute nodes to:

assign key-value pairs to respective compute nodes of the plurality of compute nodes based on relationships of key identifiers of keys in the key-value pairs and node identifiers of the respective compute nodes on an identifier ring, wherein the node identifiers of the respective compute nodes are placed at corresponding positions on the identifier ring;

determine whether a first gap on the identifier ring between node identifiers of first successive compute nodes of the plurality of compute nodes is larger by at least two positions on the identifier ring than a second gap on the identifier ring between node identifiers of second successive compute nodes of the plurality of compute nodes;

based on determining that the first gap is larger than the second gap by at least two positions on the identifier ring, initiate a shift operation that changes a node identifier of a first compute node of the first successive compute nodes to reduce a size of the first gap on the identifier ring;

move a misplaced key-value pair caused by the shift operation from the first compute node to a second compute node of the plurality of compute nodes; and after moving the misplaced key-value pair, perform a workload on the second compute node.

2. The non-transitory machine-readable storage medium of claim 1, wherein the instructions are executable in the distributed system to:

check, at the first compute node, whether the first compute node is under a shift lock, wherein the determining of whether the first gap is larger than the second gap is performed responsive to detecting that the first compute node is not under the shift lock.

3. The non-transitory machine-readable storage medium of claim 2, wherein the shift lock is a primary shift lock previously set as part of a prior shift operation of the first compute node.

4. The non-transitory machine-readable storage medium of claim 2, wherein the shift lock is a secondary shift lock requested by a neighbor compute node of the first compute node.

5. The non-transitory machine-readable storage medium of claim 1, wherein the instructions are executable in the distributed system to:

set a primary shift lock at the first compute node as part of the shift operation.

6. The non-transitory machine-readable storage medium of claim 5, wherein the instructions are executable in the distributed system to:

request that neighbor compute nodes of the first compute node set secondary shift locks at the neighbor compute nodes, wherein the shift operation is performed in response to the neighbor compute nodes accepting the request to set the secondary shift locks.

7. The non-transitory machine-readable storage medium of claim 6, wherein the instructions are executable in the distributed system to:

after completion of the shift operation, release the primary shift lock at the first compute node, and request that the neighbor compute nodes release the secondary shift locks.

8. The non-transitory machine-readable storage medium of claim 1, wherein the instructions are executable in the distributed system to:

receive, at the second compute node, a request from a new compute node to join the distributed system; and assign, by the second compute node to the new compute node, a new node identifier that is at a position halfway between the second compute node and a third compute node that is a neighbor of the second compute node.

9. The non-transitory machine-readable storage medium of claim 8, wherein the instructions are executable in the distributed system to:

determine, by the second compute node, whether a sufficient gap exists between the second compute node and the third compute node, wherein the assigning of the new node identifier is based on determining that the sufficient gap exists between the second compute node and the third compute node.

10. The non-transitory machine-readable storage medium of claim 8, wherein the instructions are executable in the distributed system to:

determine, by the second compute node, whether the second compute node is under a shift lock, wherein the assigning of the new node identifier is based on determining that the second compute node is not under the shift lock.

11. The non-transitory machine-readable storage medium of claim 1, wherein the instructions are executable in the distributed system to:

receive, at the second compute node, a request from a new compute node to join the distributed system;

determine, by the second compute node, whether a sufficient gap exists between the second compute node and a third compute node that is a neighbor of the second compute node; and based on determining that an insufficient gap exists between the second compute node and the third compute node, refer the new compute node to request another compute node of the plurality of compute nodes for joining the distributed system.

12. The non-transitory machine-readable storage medium of claim 1, wherein the instructions are executable in the distributed system to:

receive, at the second compute node, a request from a new compute node to join the distributed system;

determine, by the second compute node, whether the second compute node is under a shift lock; and based on determining that the second compute node is under the shift lock, refer the new compute node to request another compute node of the plurality of compute nodes for joining the distributed system.

13. The non-transitory machine-readable storage medium of claim 1, wherein the instructions are executable in the distributed system to:

receive, at the second compute node, a request from the first compute node to set a secondary shift lock at the second compute node;

set the secondary shift lock at the second compute node in response to the request;

detect an expiration of an expiry time of the secondary shift lock;

in response to the expiration of the expiry time, attempt to contact the first compute node; and based on detecting that the first compute node is no longer available, release the secondary shift lock at the second compute node.

14. The non-transitory machine-readable storage medium of claim 1, wherein the instructions are executable in the distributed system to:

receive, at the second compute node, a request from the first compute node to set a secondary shift lock at the second compute node;

detect that the second compute node is not a neighbor of the first compute node; and based on detecting that the second compute node is not a neighbor of the first compute node, decline to set the secondary shift lock at the second compute node and send an alert to the first compute node.

15. A first compute node comprising:

a hardware processor; and a non-transitory machine-readable storage medium storing instructions executable on the hardware processor to:

store, at the first compute node, a collection of key-value pairs, wherein the first compute node is part of a distributed system in which keys of key-value pairs are assigned to respective compute nodes of a plurality of compute nodes based on relationships of key identifiers of the keys and node identifiers of the respective compute nodes on an identifier ring, wherein the node identifiers of the respective compute nodes are placed at corresponding positions on the identifier ring;

determine whether a first gap on the identifier ring between a first node identifier of the first compute node and a second node identifier of a first neighbor compute node is different, by at least a difference threshold, from a second gap on the identifier ring between the first node identifier and a third node identifier of a second neighbor compute node, wherein the first neighbor compute node and the second neighbor compute node are part of the plurality of compute nodes;

based on determining that the first gap is different from the second gap by at least the difference threshold, initiate a shift operation that changes the first node identifier to a different value to reduce a difference between the first gap and the second gap;

move a misplaced key-value pair caused by the shift operation from the first compute node to a second compute node of the plurality of compute nodes; and after moving the misplaced key-value pair, perform a workload on the first compute node.

16. The first compute node of claim 15, wherein the instructions are executable on the hardware processor to:

receive, at the first compute node, a request from a new compute node to join the distributed system; and assign, by the first compute node to the new compute node, a new node identifier that is at a position halfway between the first compute node and the second compute node that is a neighbor of the first compute node.

17. The first compute node of claim 16, wherein the instructions are executable on the hardware processor to:

determine whether a sufficient gap exists between the first compute node and the second compute node;

determine whether the first compute node is under a shift lock wherein the assigning of the new node identifier is based on determining that the sufficient gap exists between the first compute node and the second compute node and the first compute node is not under the shift lock.

18. The first compute node of claim 15, wherein the instructions are executable on the hardware processor to set a shift lock at the first compute node as part of the shift operation.

19. A method comprising:

assigning key-value pairs to respective compute nodes of a plurality of compute nodes in a distributed system based on relationships of key identifiers of keys in the key-value pairs and node identifiers of the respective compute nodes on an identifier ring, wherein the node identifiers of the respective compute nodes are placed at corresponding positions on the identifier ring;

obtaining, by a first compute node of the plurality of compute nodes, a first distance on the identifier ring between a first node identifier of the first compute node and a second node identifier of a second compute node that is a first neighbor compute node of the first compute node;

obtaining, by the first compute node, a second distance on the identifier ring between the first node identifier of the first compute node and a third node identifier of a third compute node that is a second neighbor compute node of the first compute node, wherein the second compute node and the third compute node are part of the plurality of compute nodes;

determining, by the first compute node, whether the first distance differs from the second distance by at least a difference threshold;

based on determining that the first distance differs from the second distance by at least the difference threshold, initiating, by the first compute node, a shift operation that changes the first node identifier of the first compute node to reduce a difference between the first distance and the second distance;

moving a misplaced key-value pair caused by the shift operation from the first compute node to the second compute node or the third compute node; and after moving the misplaced key-value pair, perform a workload on the second compute node or the third compute node.

20. The method of claim 19, further comprising:

receiving, at the first compute node, a request from a new compute node to join the distributed system; and assigning, by the first compute node to the new compute node, a new node identifier that is at a position halfway between the first compute node and a neighbor of the first compute node.

* * * * *